United States Patent Office 2,805,190
Patented Sept. 3, 1957

2,805,190
METHOD FOR RETARDING THE PREMATURE POLYMERIZATION OF POLYMERIZABLE VINYLIDENE COMPOUNDS

Roger F. Monroe, Fred J. Lowes, and John F. Mulloy, Midland, Mich., assignors to The Dow Chemical Company, Midland, Mich., a corporation of Delaware No Drawing. Application September 8, 1955, Serial No. 533,252

9 Claims. (Cl. 202—57)

This invention relates to stabilizing polymerizable vinylidene compounds against premature polymerization. It pertains particularly to a method for retarding polymerization of vinylidene compounds, such as styrene-type compounds, during steps of manufacture, distillation, and handling which involve heating the polymerizable material, by a stabilizing means which does not interfere with these operations and does not interfere with deliberate polymerization of the polymerizable vinylidene compounds.

In the manufacture and processing of polymerizable vinylidene compounds, such as styrene compounds, difficulty is often encountered due to a tendency of these materials to polymerize when heated, e. g. for purpose of distillation. The difficulties become more acute when the particular vinylidene compound is a high-boiling one (requiring high distillation temperatures) and especially when the vinylidene compound polymerizes readily and at a high rate.

It has been customary to combat premature polymerization of polymerizable vinylidene compounds during processing operations by adding an inhibitor of polymerization to materials containing such polymerizable vinylidene compounds. Many compounds, such as organic amino compounds and phenolic materials, have been suggested for this purpose. Often, these added inhibitors are themselves objectionable in some way, being sometimes not wholly satisfactory in inhibiting polymerization of the polymerizable compound to which they are added, or causing objectionable color or cloudiness in the polymerizable material or in the polymerized product made therefrom. Usually, it is necessary to remove the inhibitor material before polymerizing the polymerizable compound.

A further difficulty often encountered in the use of inhibitors in reaction mixtures comprising polymerizable materials during manufacturing operations is the failure of the inhibitor due to its destruction by chemical reaction with one or more of the ingredients of the reaction mixture, whereby the inhibitor is converted chemically to material that exhibits no inhibitory action.

An object of this invention is to provide a method for retarding the polymerization of polymerizable vinylidene compounds, during steps of manufacture, distillation, and other processing operations that involve heating the polymerizable material, by a stabilizing means that does not interfere with such operations.

A further object is to provide such a method and stabilizing means that do not interfere with deliberate polymerization of the polymerizable vinylidene compounds.

A particular object is to provide such a method for retarding the premature polymerization of styrene compounds such as styrene, styrene homologues, chlorostyrene compounds, and other derivatives of styrene.

Other objects and advantages of the invention will be evident in the following description.

The objects of this invention are attained in a method for retarding the premature polymerization of polymerizable vinylidene compounds in compositions comprising the same by adding thereto an effective proportion of an alkynol having at least one acetylenic triple-bond linkage and at least one tertiary alcoholic hydroxyl radical in a molecular structure having the following generic formula

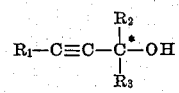

where the symbol $R_1$ represents a member of the group consisting of hydrogen, the radical

and the radical

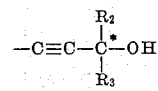

and the symbols $R_2$— and $R_3$— represent organic groups that are bonded through aliphatic carbon atoms to the alcoholic carbon atom represented by the symbol . The radicals $R_2$— and $R_3$— may be the same or different aliphatic or araliphatic group and may, together with the $C^*$ atom, be parts of a cycloaliphatic group such as a cyclohexane or substituted cyclohexane ring. The alkynol compounds, or acetylenic alcohols, are conveniently prepared in known manner by interaction of acetylene with ketones having the structure:

$$\begin{array}{c} R_2 \\ | \\ C{=}O \\ | \\ R_3 \end{array}$$

where the symbols $R_2$— and $R_3$— have the meanings given hereinbefore.

Representative examples of such already known alkynol compounds are 1-ethynylcyclohexanol, 1,1'-ethynylenedicyclohexanol, 2,5-dimethyl-3-hexyne-2,5-diol, 3,6-dimethyl-4-octyne-3,6-diol, 2,7-dimethyl-3,5-octadiyne-2,7-diol, 3,5 - dimethyl-1-hexyn-3-ol, 3 - methyl-1-nonyn-3-ol, 3-methyl-1-decyn-3-ol, 3-methyl-1-dodecyn-3-ol, 4-tert.-butyl-1-ethynylcyclohexanol, and 4-phenyl-1-ethynylcyclohexanol.

Alkynols of the kind just identified are advantageously employed to retard the polymerization of vinylidene compounds, especially styrene compounds, at temperatures in the range of from about 70° to about 110° C., in the absence of polymerization catalysts. The alkynol compounds are especially useful in retarding the polymerization of styrene compounds, i. e., monovinylaromatic compounds such as styrene, nuclear alkyl-substituted styrenes such as ar-vinyltoluene, and nuclear chlorosubstituted styrenes such as ar-chlorostyrenes and ar-dichlorostyrenes. The alkynols are unexpectedly effective in the temperature range just specified. Surprisingly, these alkynols are not effective retarders and do not appreciably affect the polymerization of vinylidene compounds at temperatures appreciably below 70° C., e. g. at room temperature, or above about 110° C., or in the presence of effective polymerization catalysts.

The premature polymerization of polymerizable vinylidene compounds in the substantial absence of polymerization catalysts and at temperatures between about 70° and about 110° C. can be retarded by adding thereto one or more of the aforementioned alkynols in amount corresponding to a small proportion of the entire stabilized composition, usually up to about 5 percent by weight, e. g., from 0.1 to 3 percent by weight, although larger or smaller proportions can sometimes be used. The discovery is advantageously useful in retarding the polymerization of vinylidene compounds during operations that involve heating at temperatures in the range between 70° and 110° C., especially during distillation operations. For use as retarder during distillation of a polymerizable vinylidene compound, there is preferably selected an alkynol, or a mixture of alkynols, of the kind specified, that has a distillation temperature near to, but preferably higher than, the distillation temperature of the polymerizable vinylidene compound. Thereby the retarder tends to be distributed throughout the distillation system, e. g. into the column and condenser, as well as in the pot or reboiler, where heating of the polymerizable compound takes place.

The use of alkynol compounds in the manner described is further advantageous in that the deliberate polymerization of polymerizable vinylidene compositions containing such alkynol compounds can be readily effected, without removing the alkynol compound, by subjecting the compositions to polymerization conditions, e. g. by heating to a temperature above about 110° C., or by heating together with a polymerization catalyst. Furthermore, the alkynol compounds are colorless and are usually not objectionable in the polymeric product. They often confer beneficial characteristics on the polymeric product, e. g. increased heat stability.

As a demonstration of the effect of these alkynol compounds on the polymerization of polymerizable vinylidene compounds, the following test was devised, using 2,5-dichlorostyrene as exemplary of the class of polymerizable vinylidene compounds. To separate 30-gram portions of 2,5-dichlorostyrene in 2-ounce bottles was admixed 0.3 gram of one of the alkynol compounds named in Table I, such amount corresponding to 1 percent by weight of the mixture, except that one portion of monomeric 2,5-dichlorostyrene was left untreated to serve as a control material. The test samples so prepared were placed in an air oven at a temperature of 100° C., and a thermocouple of a recording thermometer was placed in each sample. In Table I are shown, for each test sample, the maximum temperature reached in each sample, and the time required for the temperature of the test sample to go from 100° C. to that maximum observed temperature.

TABLE I

| Retarder | Maximum Temperature, ° C. | Time from 100° C. to Maximum Temp., hours |
| --- | --- | --- |
| None, control | 188 | .1 |
| 1-Ethynylcyclohexanol | 145 | 1.7 |
| 1,1'-Ethynylenedicyclohexanol | 132 | 1.5 |
| 2,5-Dimethyl-3-hexyne-2,5-diol | 142 | 1.3 |

In the test just described, 2,5-dichlorostyrene was selected as representative of polymerizable vinylidene compounds which normally polymerize rapidly and exothermically when heated en masse. In that test, the maximum temperature reached by the sample and the time necessary to go from 100° C. to that maximum temperature are indexes of the rate and extent of polymerization of the sample. In the test, the proportion of retarder was intentionally less than that capable of giving maximum retardation effect, in order that the several alkynols might be compared with one another. Furthermore, the conditions of the test permitted the exothermic polymerization reaction to raise the temperature above 110° C., i. e., into a range of temperature in which the alkynol compounds are not effective retarders. In spite of these adverse conditions, and in contrast to the control sample, the test samples containing alkynols according to this invention attained lower temperatures maxima and required longer times to reach such maxima, thereby demonstrating that the alkynol compounds have retardation effect on polymerization of vinylidene compounds. Substantially the same results were obtained when, in place of 2,5-dichlorostyrene, other polymerizable vinylidene compounds were used, e. g. other styrene compounds, and acrylic esters such as methyl methacrylate.

The following example illustrates the invention, but should not be construed as limiting its scope.

*Example*

Two separate, duplicate distillation apparatuses were assembled for conducting continuous distillation under vacuum. Each apparatus comprised a pot, a rectifying column, and a reflux condenser with distillate take-off and receiver means. Provision was made for feeding a liquid charge to each still pot. In these apparatuses, identified as stills A and B, were carried out two distillation tests, identified as Tests A and B, respectively.

Into each still pot was charged 500 grams of 2,4-dichloro-(1,2-dichloroethyl)benzene to serve as a high boiling heat transfer medium. Into each still pot was also charged 0.5 gram of one of the following materials, to serve as polymerization retarder for polymerizable compounds in the distillation residue:

Still A: 4-chloro-2,6-dinitrophenol
Still B: 4-tert-butyl-1-ethynylcyclohexanol

Into each still pot was fed a stream of a mixture of ar-dichlorostyrenes to be distilled. The feed mixture comprised principally the 2,4- and 2,5-dichlorostyrene isomers and contained also the 2,3-, 2,6- and 3,4-dichlorostyrene isomers. The feed mixture to each still also contained 0.1 percent by weight of 1-ethynylcyclohexanol. The feed mixtures were fed to the stills at average rates of 500 cc. per hour with heating to effect substantially complete distillation of the dichlorostyrene compounds. Under an absolute pressure of about 0.5 mm. of mercury, the distillation temperatures were from 60° to 67° C., while the pot temperatures were about 110° C.

The temperature gradient within the distillation column extended over the range between the pot temperature and the distillation temperature, i. e. most of the material within the column was at temperatures of from about 70° to about 110° C. Under these conditions, the monomeric dichlorostyrene compounds were substantially distilled out of the stills. The 1-ethynylcyclohexanol in the feed material substantially codistilled with the dichlorostyrenes. The higher-boiling 4-chloro-2,6-dinitrophenol and 4-tert.-butyl-1-ethynylcyclohexanol substantially remained in the still pots of stills A and B, respectively. After three days of continuous operation in the manner described, during which time the distillation residues were allowed to accumulate in the still pots, the distillations were stopped and the still pot residues were analyzed. Each still pot residue was diluted with methanol and the precipitated polymer was collected, dried and weighed. The amount of polymer so obtained, in percent by weight of the respective still pot residues, was as follows:

Test A: Solid polymer 10.79 percent of pot residue
Test B: Solid polymer 5.26 percent of pot residue When an attempt was made to distill the ar-dichlorostyrene mixture in a manner similar to that just described, but without any retarder of any kind being present in either feed material or still pot, rapid polymerization occurred in both pot and column of the still forcing almost immediate discontinuation of the distillation.

In test A above, it is evident that the codistillable 1-ethynylcyclohexanol in the still feed afforded effective retardation of polymerization. The retardation of polymerization was even more effective in test B where the codistillable 1-ethynylcyclohexanol, acting to retard polymerization in the column and vapor spaces of the still, cooperated with the higher-boiling 4-tert.-butyl-1-ethynylcyclohexanol acting to retard polymerization in the still pot residue.

The ar-dichlorostyrene distillates obtained in tests A and B above, were colorless and capable of polymerization to solid resins without prior separation of the 1-ethynylcyclohexanol contained therein.

We claim:

1. In a method that comprises heating a polymerizable vinylidene compound at temperatures between 70° and 110° C. in the absence of added polymerization catalysts, the improvement that comprises retarding the polymerization of the vinylidene compound during such heating by incorporating in such vinylidene compound an effective proportion of at least one alkynol selected from the group consisting of alkynols having the structural formulae

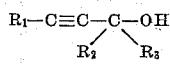

and

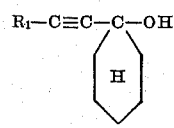

wherein the symbol $R_1-$ represents a member of the group consisting of hydrogen and the radicals

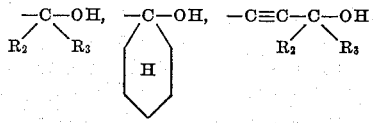

and

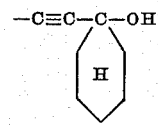

each of the symbols $R_2-$ and $R_3-$ individually represents a radical selected from the class consisting of aliphatic and araliphatic hydrocarbon radicals, and the symbol

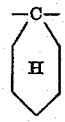

represents a carbocyclic group selected from the class consisting of cyclohexane and hydrocarbon-substituted cyclohexane groups.

2. The improvement according to claim 1 wherein the polymerizable vinylidene compound is a styrene compound.

3. The improvement according to claim 1 wherein the proportion of alkynol material is from 0.1 to 5 percent by weight of the resulting composition.

4. The improvement according to claim 3 wherein the polymerizable vinylidene compound is a styrene compound.

5. The improvement according to claim 4 wherein the alkynol material comprises 1-ethynylcyclohexanol.

6. The improvement according to claim 4 wherein the styrene compound is at least one ar-dichlorostyrene.

7. The improvement according to claim 6 wherein the alkynol material contains 1-ethynylcyclohexanol and 4-tert.-butyl-1-ethynylcyclohexanol.

8. In a method that comprises subjecting a polymerizable composition containing a vinylidene compound to distillation at temperatures between about 70° and about 110° C. in the absence of added polymerization catalysts, the improvement that comprises retarding the polymerization of the vinylidene compound during such distillation by incorporating in the composition at least one alkynol selected from the group consisting of alkynols having the structural formulae

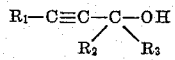

and

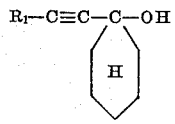

wherein the symbol $R_1-$ represents a member of the group consisting of hydrogen and the radicals

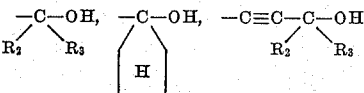

and

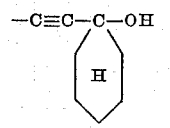

each of the symbols $R_2-$ and $R_3-$ individually represents a radical selected from the class consisting of aliphatic and araliphatic hydrocarbon radicals, and the symbol

represents a carbocyclic group selected from the class consisting of cyclohexane and hydrocarbon-substituted cyclohexane groups.

9. The improvement according to claim 8, wherein the polymerizable composition comprises at least one ar-dichlorostyrene, and the alkynol material contains 1-ethynylcyclohexanol and 4-tert.-butyl-1-ethynylcyclohexanol.

No references cited.